United States Patent
Laborda Rami

(10) Patent No.: US 10,366,796 B2
(45) Date of Patent: Jul. 30, 2019

(54) PASSIVE DEPRESSURIZATION SYSTEM FOR PRESSURIZED CONTAINERS

(71) Applicant: ASVAD INT, S.L., Tarragona (ES)

(72) Inventor: Arnaldo Laborda Rami, Tarragona (ES)

(73) Assignee: ASVAD INT, S.L., Tarragona (ES)

( * ) Notice: Subject to any disclaimer, the term of this patent is extended or adjusted under 35 U.S.C. 154(b) by 125 days.

(21) Appl. No.: 15/118,202

(22) PCT Filed: May 5, 2014

(86) PCT No.: PCT/ES2014/070383
§ 371 (c)(1),
(2) Date: Aug. 11, 2016

(87) PCT Pub. No.: WO2015/169975
PCT Pub. Date: Nov. 12, 2015

(65) Prior Publication Data
US 2017/0133111 A1 May 11, 2017

(51) Int. Cl.
*G21D 3/06* (2006.01)
*G21C 15/18* (2006.01)

(52) U.S. Cl.
CPC .............. *G21C 15/18* (2013.01); *G21D 3/06* (2013.01); *Y02E 30/40* (2013.01)

(58) Field of Classification Search
CPC .......... G21C 15/18; G21D 3/06; Y02E 30/40
USPC ...................................................... 137/498
See application file for complete search history.

(56) References Cited

U.S. PATENT DOCUMENTS

| 4,064,002 A | 12/1977 | Desmarchais et al. |
| 4,522,369 A * | 6/1985 | Gemignani ........... F16K 17/105 137/492 |
| 4,763,688 A * | 8/1988 | Morris .................. B65D 90/34 137/498 |
| 5,309,488 A | 5/1994 | Matsuoka |

(Continued)

FOREIGN PATENT DOCUMENTS

| CH | 679880 A5 | 4/1992 |
| JP | H08-198181 A | 8/1996 |

OTHER PUBLICATIONS

Druckminderer—Wikipedia, retrieved Dec. 11, 2014 from http://de.wikipedia.org/w/index.php?title=Druckminderer&oldid=127409077.

*Primary Examiner* — Eric Keasel
(74) *Attorney, Agent, or Firm* — Knobbe, Martens, Olson & Bear, LLP

(57) ABSTRACT

The depressurization system comprises a main valve (8) provided with a pneumatic actuator with an opening spring (10) which can be connected at one side to a pressurized container (1) housing a gas inside it and at the other side to the atmosphere, defining this opening spring (10) a predetermined mechanical pressure, so when the pressure inside the pressurized container (1) is bigger than the predetermined mechanical pressure, the main valve (8) remains closed, and when the pressure inside the pressurized container (1) is lower than the predetermined mechanical pressure, the main valve (8) opens, allowing the pressurized gas from container (1) be discharged into the atmosphere.

It does not require any external power supply for their main operation, allowing to fulfill appropriately their role in accident scenarios, even with total loss of electric power.

10 Claims, 3 Drawing Sheets

(56) References Cited

U.S. PATENT DOCUMENTS 6,953,052 B2 * 10/2005 Lehtonen ............. F02M 55/025
137/498
2012/0161048 A1 6/2012 Pucher

* cited by examiner

PASSIVE DEPRESSURIZATION SYSTEM FOR PRESSURIZED CONTAINERS

CROSS-REFERENCE TO RELATED APPLICATIONS

This application is the U.S. National Phase under 35 U.S.C. § 371 of International Application PCT/ES2014/070383, filed May 5, 2014, the disclosure of which including the specification, the drawings, and the claims is hereby incorporated by reference in its entirety.

The present invention relates to a depressurization system for pressurized containers, mainly to the accumulators for injection of borated water, usually installed as a security system in a nuclear reactor, but not limited to them.

BACKGROUND OF THE INVENTION

A nuclear reactor generates heat even after a long time being stopped the nuclear reaction inside. This residual heat must be removed by special cooling systems to maintain their integrity. In case this heat cannot be extracted, the temperature rises enough to generate explosive atmospheres of hydrogen, and ends with the core meltdown, and the possible release of radioactive substances into the environment.

In the event of total electric power loss, the only way to maintain the cooling of the core is by means of what is called "natural circulation". This is a physical process that creates flows in the cooling system pipes by the effect of the temperature difference between the outflow water from reactor, and the returned water from the steam generator tubes. The steam generator is where the heat from the core is exchanged and extracted to the outside as clean steam. This steam can be dissipated into the atmosphere, avoiding a direct communication between the core and the external environment.

Systems designed to mitigate these accidents usually include, among others, an injection system of borated water to the reactor. Their mission is to recover the water level in the reactor to maintain the cooling and, additionally, to maintain the concentration of boron in the water, to ensure an adequate shutdown margin to keep the reactor under the critical level.

This system consists of one or more accumulators containing a certain amount of borated water, which is pressurized with nitrogen at a given pressure. These accumulators are connected to the reactor through an isolation valve (opened by default) and a non-return valve.

Under normal conditions, the pressure in the reactor is higher than the pressure in the accumulator. Under these conditions, the non-return valve remains closed and no injection is performed. However, after a depressurization accident, when the reactor pressure falls under the pressure inside the accumulator, this pressured nitrogen starts to inject the borated water to the reactor, until the complete emptying of borated water. Once emptied, the operator must close the isolation valve and stop this injection.

When the accident occurs with more severe events, as the total loss of electric power, the control of the injection equipment is lost. That means that when the pressure in the reactor continues falling under a certain value, the pressurized nitrogen goes inside the reactor cooling circuit.

This nitrogen inside the cooling system has not any adverse effect on the chemical or radiological activity of the reactor. However, that nitrogen is a non-condensable gas, which finally goes to the higher parts of the circuit, mainly the top of the steam generator tubes. This accumulation of non-condensable gas causes the disruption of the natural recirculation flow, which is the only available way to extract the heat outward. This nitrogen greatly complicates the subsequent cooling of the core and substantially increases the chances of core melting.

To prevent this nitrogen reaches the reactor and the steam generators tubes only two strategies may be taken:

The first strategy is to close the valve connecting the accumulator to the reactor when water injection ends. This strategy has several drawbacks: These valves are normally opened and permanently disconnected to avoid a spurious closure. Its necessary to energize them and give them the closure order. However, during accident scenarios without electric power, its impossible to close. Even if it could be achieved by portable systems, isolation may be done either too soon, so that the borated water injection does not take place completely, either too late, when nitrogen has reached the reactor.

The second strategy is to vent the nitrogen to the atmosphere by means of relief valves. This approach suffers from similar drawbacks as above.

Therefore, its evident the need for some automatic system, which prevents the entry of unwanted nitrogen to the reactor, without requiring any external energy for their operation. Furthermore, the system should automatically recognize the appropriate time for its operation. This allows, on one hand, their unattended operation, and on the other hand, to maximize the effect of the injection of cooling water to the reactor. This also should ensure that nitrogen doesn't go into the reactor system.

DESCRIPTION OF THE INVENTION

First, in this description reference is made to a security system commonly used in a nuclear power plant, and that includes the present invention. However, it should be noted that this depressurization system can also be used in other applications.

With the depressurization system according to the present invention, the aforesaid problem and disadvantages are solved, allowing other advantages that will be described below.

The depressurization system for pressurized containers according to the present invention is characterized in that it comprises a main valve provided with an opening spring and a pneumatic actuator, which can be connected at one side to a pressurized container filled with a gas, and at the other side to the atmosphere. This opening spring defines a predetermined mechanical pressure, so when the pressure inside the pressurized container is higher than the predetermined mechanical pressure, the main valve remains closed, and when the pressure inside the pressurized container is lower than the spring predetermined mechanical pressure, this main valve opens and allows the depressurization of the container to the atmosphere.

Preferably, the depressurization system for pressurized containers according to the present invention, may also comprise a solenoid valve connected between the pressurized container and the main valve, and may also comprise at least a manual valve connected between the pressurized container and the main valve.

Advantageously, the depressurization system for pressurized containers according to the present invention, may also comprise a pneumatic line connecting the output of this main valve, with a pneumatic motor geared with the actuator of an isolation valve connected to the outlet of this pressure vessel, in order to be able to close this valve with the exhausted gas, as one redundancy to prevent the intrusion of gas in the circuit.

According to an alternative embodiment, with significant operational advantages over the basic system, this main valve is defined inside a housing which comprises:

A connection to the pressurized container;

A pressurized chamber where the gas from the pressurized container is accumulated;

A shut-off element subjected to the pressure in the pressurized gas chamber and which is associated with this opening spring; and At least one gas outlet that, when the pressure inside the pressurized chamber exceeds the predetermined mechanical pressure, the shut-off element closes the communication between the pressurized chamber and the gas outlet, against the action of the opening spring. And when the pressure inside the pressurized chamber is lower than the predetermined mechanical spring pressure, that pressure chamber is in communication with the gas outlet, allowing the pressurized gas container to be exhausted to the atmosphere.

Preferably, the pressure chamber comprises a floater, which closes the communication connection with the pressure vessel gas outlet, in the case of presence of liquid into the pressurized chamber.

Furthermore, the depressurization system for pressurized containers according to the present invention may also comprise a piston associated with a second closing spring, which closes the communication of the pressurized vessel connected to the gas outlet, by means of air injection through a first air inlet. And can also comprise an opening piston associated with a third spring, which opens communication of the pressurized container with the gas outlet, by injecting air through a second input air.

Furthermore, the depressurization system for pressurized containers according to the present invention, also preferably comprises a threaded disc associated with this shut-off element and their opening spring, so its position relative to the shut-off element defines the predetermined mechanical pressure exerted by this opening spring.

Preferably, the depressurization system according to the invention also comprises a plurality of parts placed inside the housing, and some screws accommodated in threaded holes made between these parts. These screws are able to adjust the relative position of these parts to each other, with distances that are multiples of the thread used.

The depressurization system according to the present invention has at least the following advantages:

It does not require any external power supply for their main operation, allowing to fulfil appropriately their role in accident scenarios, even with total loss of electric power;

Performs its action at the right time for system recovery, and only when all the borated water is injected, and prevents the entry of gas into the reactor circuit, performing this action automatically without human assistance;

During normal operation, and by means of an external air pressure, remote positioning is allowed to open or close the main valve, considering this valve could be installed in difficult access area;

When compressed air is not available, the manual positioning feature is still available, with some simple additional mechanism that can push the opening or closing pistons;

Its simplicity and robust design, especially in the alternative embodiment, results in high reliability of its components, which is required for safety systems in a nuclear power plant;

This simple design also facilitates the maintenance of the device, as it can easily be disassembled into its components, and all can be fully inspected over their complete surfaces. Easy adjustment and verification of its operation is also taken in account;

Its easy way of installation in existing facilities, because its only needed to be connected to the output manual vent valve, which is usually installed in these accumulators. And the system of the present invention presents a low volume and weight. These variables should always be taken into account in the usual seismological studies done in the nuclear sector.

BRIEF DESCRIPTION OF THE DRAWINGS

For better understanding of what has been disclosed, some drawings are attached, where, schematically and only as non-limitative examples, two practical cases of embodiment is showed.

DESCRIPTION OF THE FIRST EMBODIMENT

Figure 1:
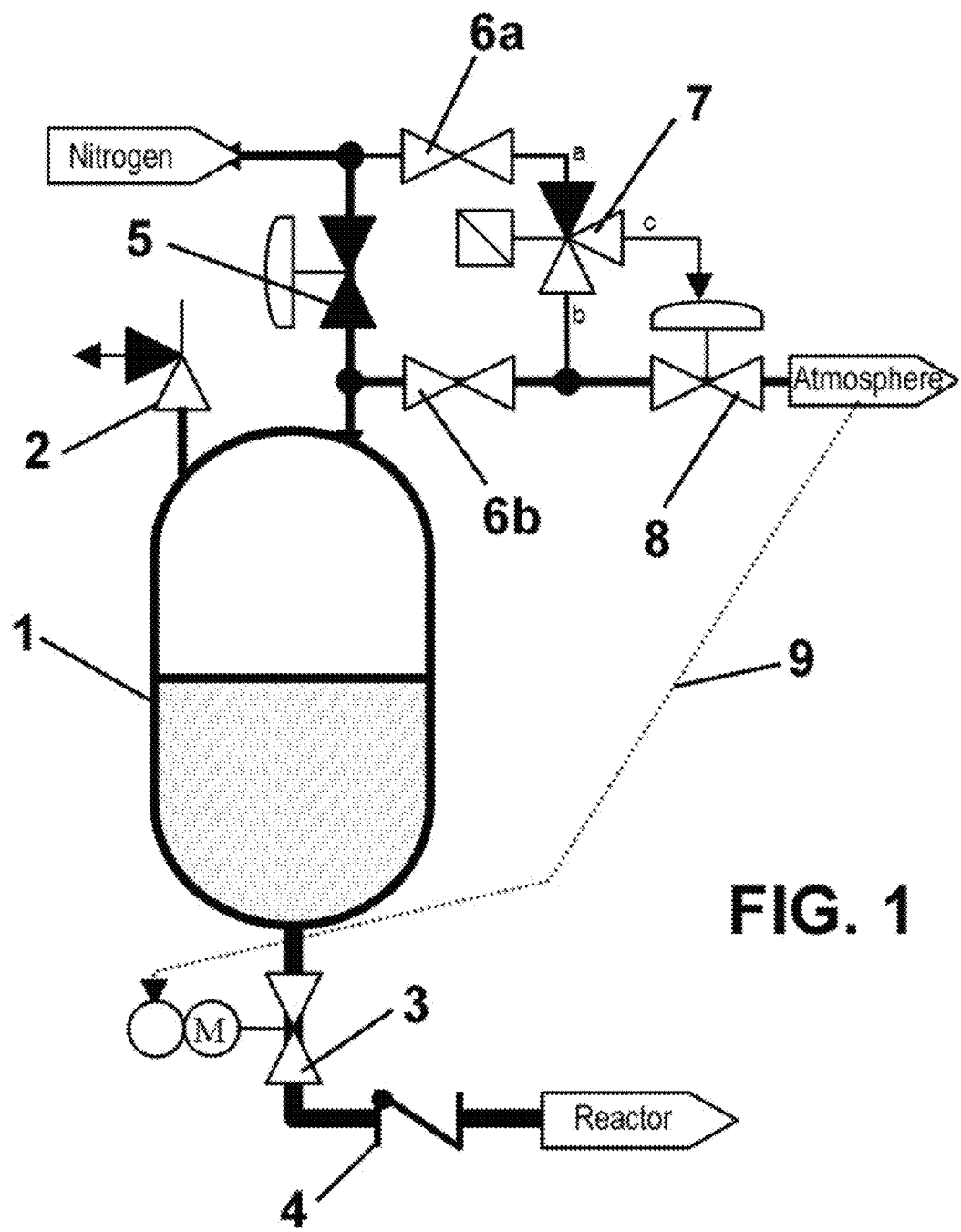
FIG. 1 is a system diagram of a safety injection accumulator typically used in a nuclear power plant, which includes the present invention according to a first embodiment.

As can be seen in FIG. 1, the circuit where the depressurization system according to the present invention is installed, comprises a pressure vessel 1, also called accumulator, which is a vessel containing borated water, pressurized with gas, for example nitrogen. This circuit also comprises an overpressure safety valve 2 in the accumulator 1; an isolation valve 3 between the accumulator 1 and the reactor (not showed in the figure); the non-return valve 4, which prevents the flow of cooling fluid in opposite direction from the reactor to the accumulator 1; and one valve 5 for intake/vent gas to the accumulator 1.

It should to be noted that these aforesaid elements are shown in the figures and described here to improve the understanding of the operation of the system of the present invention in their usual context. But these elements are not part of the present invention.

The depressurization system according to the present invention comprises a main valve 8, with an actuator or piston, and with an opening spring of adjustable mechanical pressure (not shown in this figure), so when there is not pressure in the actuator, the valve is automatically opened.

The depressurization system of the present invention, also comprises preferably a three-way solenoid valve 7, so when this solenoid 7 is energized, the fluid flows between points a and c, and with solenoid 7 not energized, the fluid flows between points b and c. Additional solenoid valve can be added to be able to open or close the valve on demand. In its minimum configuration, the solenoid can be replaced directly by a tube between their points b and c.

The depressurization system of the present invention also comprises preferably two manual isolation valves 6a and 6b in order to isolate the depressurization system from the main supply line.

As an additional functionality, it can be installed a pneumatic line 9 supplying the exhausted gas to a pneumatic motor M, geared with the actuator of the valve 3, which allows emergency closure of this valve.

Operation of the First Embodiment

The operation of the system focuses on the valve 8 and, in particular, between their pneumatic actuator and their opening spring. Between them, the following antagonist condition is met: the spring has a predetermined mechanical force Fa that is trying to open the valve. Against this action, the actuator exerts a closing force Fc who is dependent, among other variables, from the pressure at which it is fed. While this pressure is above a certain value, it will be that Fc>Fa and the valve will remain closed indefinitely.

While accident conditions, and after the injection has started from the accumulator 1, the gas pressure will gradually decrease as the borated water is leaving it. Pressure will reach a lower value when the injection has been completed, and there is no more borated water in accumulator 1.

Then, the pressure should begin to make Fa>Fc and, therefore, the opening spring begins to open the valve 8. Just after the start of the opening, a positive feedback will open completely the main valve 8, because the more the valve is opened, the actuator is more depressurized, and the spring has more force to open the valve.

Their effect is the complete depressurization of accumulator 1, preventing that gas can reach the reactor coolant circuits. If there is a pneumatic motor M on the valve 3, the evacuated gas can be enough even to close the isolation valve 3, which leaves the system in a more secure position.

The three-way solenoid valve 7 is included to recover the initial configuration after the complete depressurization of accumulator. Under these conditions, the main valve 8 is kept open, precluding refilling accumulator 1 through the valve 5.

To close the main valve 8, it will be necessary to energize the solenoid 7 and open the gas from the supply, through ducts a-c to the actuator. This way, the main valve 8 is closed again, and now the accumulator 1 can be pressurized again through the valve 5. This can also be achieved by manually closing the valve 6b.

Once the working pressure is established in the accumulator, the de-energization of the solenoid 7 realigns the ducts b-c and the system is armed again for reuse.

DESCRIPTION OF THE SECOND EMBODIMENT

Figure 2:
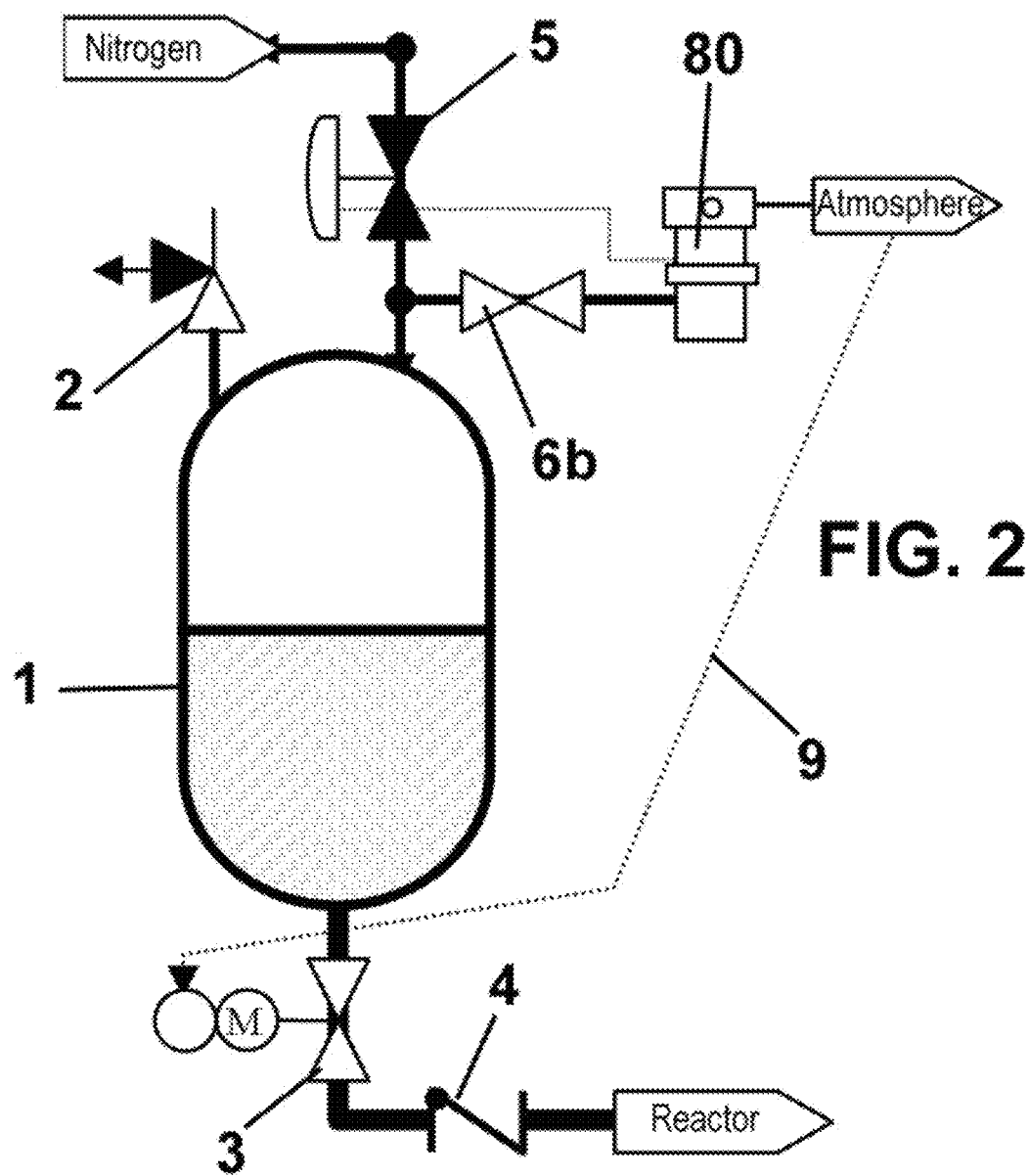
FIG. 2 is a system diagram of a safety injection accumulator typically used in a nuclear power plant, which includes the present invention, according to a second embodiment.
Figure 3:
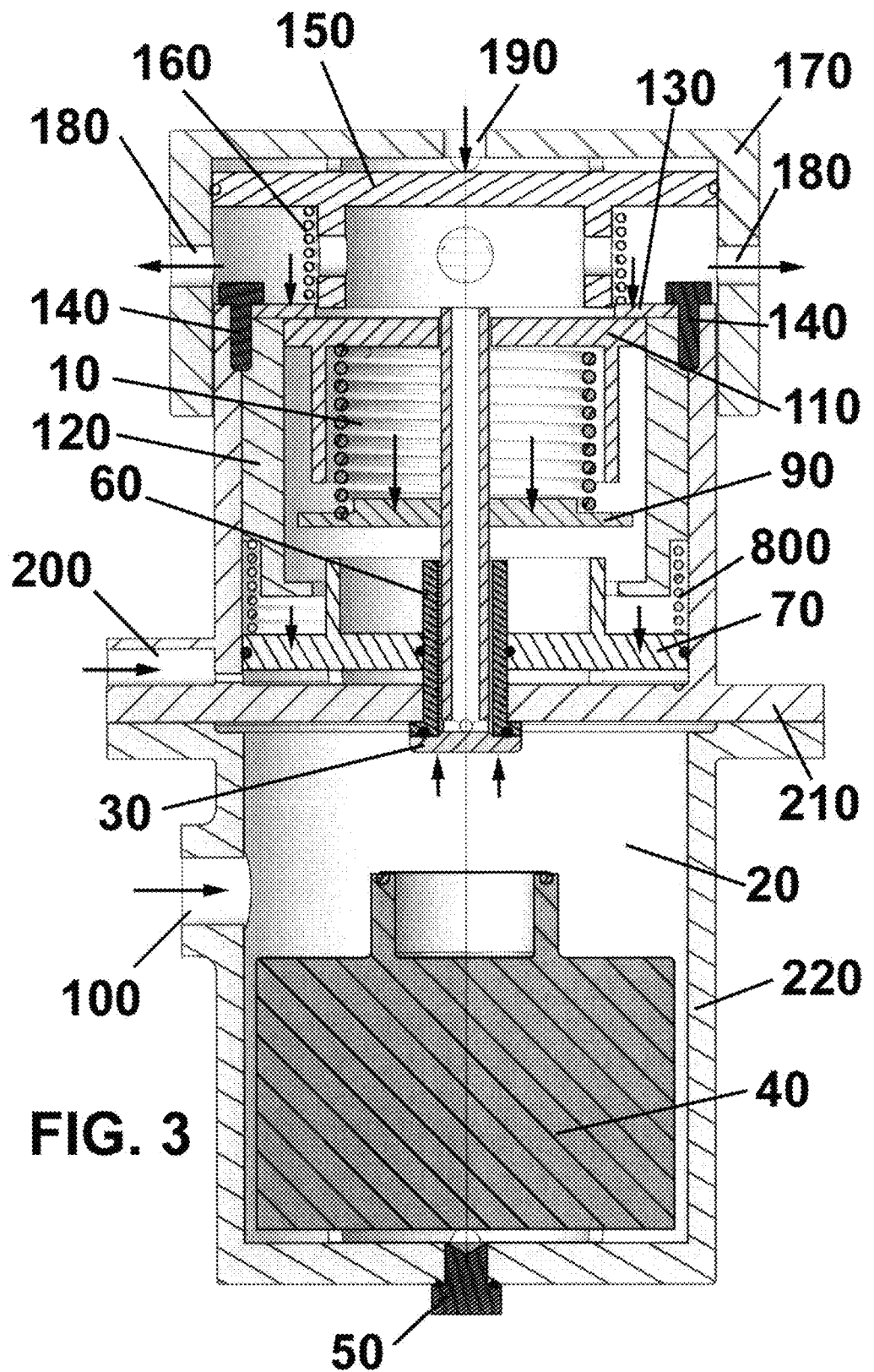
FIG. 3 is a sectional view of the housing according to the second embodiment. In their inside, the main valve is defined.

In FIGS. 2 and 3 is showed a second embodiment of the depressurization system according to the present invention.

In this embodiment, the main valve 8 is defined inside a housing 80, as can be seen in FIG. 3 and as described below.

This housing 80 is installed after the isolation valve 6b in the same way as in FIG. 1. In this embodiment the solenoid valve is no longer needed, and in its place, it can be a simple tube between the actuator of the valve 5 and a first input air 200 in the housing 80. This connection means that when the intake valve 5 is opened, the main valve 8 defined in the housing 80, is simultaneously closed, as described below. An independent control (different from the valve 5), can also be used by means of an additional solenoid.

FIG. 3 shows with detail the elements inside this housing 80.

This housing 80 comprises a connection to the accumulator 100 that allows the gas inlet to a pressurized chamber 20. This pressurized chamber 20 supports the same internal pressure of the accumulator 1.

At its upper side, and centred on its axis, there is a closing cylinder 60 and a shut-off element 30, which close the chamber by means of an O-ring between them. After the closing area, the shut-off element 30 has some small holes leading to a central tube.

The closing cylinder 60 also has the mission of the guidance of the shut-off element 30, and also serves as a sealing surface to the piston 70. An additional function may also be working as the limiting end of the stroke of the shut-off element 30.

In this embodiment, it can be considered that the shut-off element 30, the opening spring 10 and the adjusting disc 90, performs the same function of the main valve 8 of the first embodiment. This disk 90 is linked through threaded engagement with the shut-off element 30.

There is also a piece 110 that is the base and housing for the opening spring 10, This opening spring 10 push down the adjustment disk 90 and the shut-off element 30. This piece 110 is held by pieces 120 and 130, which are locked by screws 140.

Their sizing and positioning should be the adequate to get the right working point to the opening spring 10, and the allowable shut-off element 30 opening stroke.

As seen in FIG. 3, the housing 80 comprises an upper housing 170 attached to a central body 210 by a thread between both. Thus, the upper housing 170 is a protection of the internal elements of the system.

Inside the element 170 there is a piston assembly used to open unconditionally the shut-off element 30. In the bottom of element 210 there is another piston assembly to close unconditionally the shut-off element 30.

The housing 80 also comprises a lower body 220 coupled to the main body 210. This lower body 220 defines inside the pressure chamber 20. The junction between the lower body 220 and the main body 210 may be performed in different ways, but the preferred embodiment is through an O-ring and enough screws between both, as a flange-like seal. These screws and O-ring are not illustrated in FIG. 3.

In the bottom side of the pressure chamber 20, there is a floater device 40 made from a hollow, or filled with a material of low density and high strength. In the bottom side of the pressurized chamber 20, there is a threaded purge plug 50, with their corresponding O-ring, which can be used to depressurize the chamber 20, and can be a point of supplying test pressure during the calibration of the system.

Operation of the Second Embodiment

The operation of the depressurization system, according to this second embodiment, is explained as follows. While in the pressurized chamber 20 there is enough pressure, this pressure exert an upward force Fc on the shut-off element 30 to counteract and overcome the force Fa exerted by the weight of the shut-off element 30 and the adjusting disc 90, plus the force exerted by the opening spring 10. While Fc>Fa, the higher pressure in the pressure chamber 20 keeps closed the valve indefinitely.

During accident conditions, as the accumulator 1 gets empty from borated water, the gas will expand and the pressure will decrease inside the accumulator 1. When all the borated water has left the accumulator 1, it will remain a residual pressure. This residual pressure cannot counteract the force of the opening spring 10, allowing the displacement to the bottom of the shut-off element 30. Consequently, the gas will go through their holes and central cavity, and finally through the outlet ports 180, until the total depressurization of the accumulator 1 to atmospheric pressure.

Once reached this state, the shut-off element 30 remains in its lower position, leaving the system opened. This shut-off element 30 only can return to its back position by re-pressurization of the pressure chamber 20, or actuating piston 70 by injecting pressured air through the first inlet 200, or by other mechanical push. Then, piston 70 slides to the top and push up the adjustment disk 90, pulling this shut-off element 30 until it goes to their top position closing the valve.

The closing piston 70 returns to its default state by a second spring 80, and after depressurization of the first inlet 200.

The opening piston 150 can unconditionally open the valve and depressurizes the accumulator 1 when, by maintenance or other operational reasons, were required. This can be accomplished when pressurized air is injected through a second input 190. Then, this piston 150 pushes down the piece 110, the opening spring 10, the disc 90 and the shut-off element 30, just opening the way from the pressure chamber 20 to the air outlets 180.

Once depressurized, a third spring 160 returns piston 150 to its default position. The same opening effect can be achieved mechanically when instead of air pressure, the piston 150 is pushed by a simple threaded screw with enough length or other pushing element from the same air inlet 190.

The relative position between the shut-off element 30, and the adjusting disc 90 which is obtained by rotating the first over the second, determines the mechanical pressure in the opening spring 10, and thus the pressure of the pressurized chamber 20 when the system will actuate.

To facilitate the relative positioning between the parts 120 and 130, and also with the main body 210, some threaded screws 140 are disposed between threaded parts 120, and 130, and the main body 210. This way of fixing, allows the fine positioning of these elements between themselves in distances that are multiples of the thread used.

Finally the floater 40 has the mission of closing of the valve in the case of failures in the non-return valve 4. After their depressurization actuation, this opened valve could become a point of reactor coolant leakage.

The operation of the floater 40 is autonomous and automatic by simple flotation over the leaked refrigerant. Once reached the upper limit, the simple difference of pressure between inside and outside, keeps the valve closed, since the cavity in the upper side of the floater, is able to contain all the shut-off element 30 in its open position.

Although reference to a specific embodiment of the invention has been made, it is evident to one skilled in the art, that the depressurization system described is susceptible of numerous variations and modifications, and that all the details mentioned can be replaced with other technically equivalent, without departing from the scope of protection defined by the appended claims.

The invention claimed is:

1. A nuclear reactor comprising a depressurization system for a pressurized container, comprising a main valve which comprises:
    a pneumatic actuator, and
    an opening spring,
    wherein:
    the main valve is configured to be fluidly connected at one side to a pressurized container in which contains a gas and at the other side to the atmosphere, and
    the opening spring is adjusted to set a predetermined mechanical pressure such that when a pressure inside the pressurized container is bigger than the predetermined mechanical pressure, the main valve remains closed, and that when the pressure inside the pressurized container is lower than the predetermined mechanical pressure, the main valve opens to establish a fluid communication so as to allow the pressurized gas from the pressurized container be discharged into the atmosphere.

2. The nuclear reactor according to claim 1, wherein the depressurization system further comprises at least one solenoid valve configured to be connected between the pressurized container and the main valve.

3. The nuclear reactor according to claim 1, wherein the depressurization system further comprises at least one manual valve configured to be connected between the pressurized container and the main valve.

4. The nuclear reactor according to claim 1, wherein the depressurization system further comprises a pneumatic line which can connect an output of the main valve with a pneumatic motor of an isolation valve configured to be connected to an output of the pressurized container.

5. The nuclear reactor according to claim 1, wherein the main valve is disposed inside a housing, the housing comprises:
    a connection to the pressurized container;
    a pressurized chamber where the gas from the pressurized container is accumulated;
    a shut-off element which receives the gas pressure from the pressurized chamber and that is associated with the opening spring; and
    at least one gas outlet,
    wherein:
    when the pressure inside the pressurized chamber is bigger than the predetermined mechanical pressure from the opening spring, the shut-off element closes the fluid communication between the pressurized chamber and the gas outlet, against the action of the opening spring, and
    when the pressure inside the pressurized chamber is lower than the predetermined mechanical pressure from the opening spring, the pressurized chamber is in fluid communication with the gas outlet or outlets and the gas from the pressurized container will be discharged to the atmosphere.

6. The nuclear reactor according to claim 5, wherein the pressurized chamber comprises a floater that closes the communication from the connection of the pressurized container with the outlet gas when a certain amount of liquid comes inside the pressurized chamber.

7. The nuclear reactor according to claim 5, wherein the depressurization system further comprises a closing piston associated with a second spring closing the communication connection of the pressurized container with the gas outlet or outlets by injecting air through a first air inlet.

8. The nuclear reactor according to claim 5, wherein the depressurization system further comprises an opening piston associated with a third spring which opens the communication from the connection of the pressurized container with the gas outlet or outlets by injecting air through a second air inlet.

9. The nuclear reactor according to claim 5, wherein the depressurization system further comprises an adjusting disk associated with the shut-off element and with the opening spring so that a relative position to the shut-off element of the adjusting disk defines the default mechanical pressure for the opening spring.

10. The nuclear reactor according to claim 5, wherein the depressurization system further comprises at least three threaded parts placed inside the housing and a plurality of screws housed in threaded holes made in the at least three threaded parts, such that the plurality of screws are configured to adjust the relative position of the at least three threaded parts.

* * * * *